(12) United States Patent
Baik

(10) Patent No.: US 7,848,267 B2
(45) Date of Patent: Dec. 7, 2010

(54) SYSTEM AND METHOD FOR PERFORMING REMOTE CALLING

(75) Inventor: Kun-Hoon Baik, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 743 days.

(21) Appl. No.: 11/848,076

(22) Filed: Aug. 30, 2007

(65) Prior Publication Data

US 2008/0057921 A1  Mar. 6, 2008

(30) Foreign Application Priority Data

Aug. 30, 2006  (KR) .................. 10-2006-0083180

(51) Int. Cl.
  *H04B 7/15*  (2006.01)
  *H04B 7/005*  (2006.01)
  *H04Q 7/00*  (2006.01)
  *H04W 24/00*  (2009.01)

(52) U.S. Cl. .................. 370/278; 370/328; 455/456.3; 455/11.1

(58) Field of Classification Search .................. 370/278, 370/282, 312, 328, 338, 401, 432; 455/404.2, 455/456.1, 456.2, 456.3, 11.11
See application file for complete search history.

(56) References Cited

U.S. PATENT DOCUMENTS

| 7,302,258 | B1 * | 11/2007 | Sylvain ................ 455/432.1 |
| 7,525,937 | B2 * | 4/2009 | O'Neill .................. 370/328 |
| 2004/0136337 | A1 * | 7/2004 | Warrier et al. ............. 370/328 |
| 2007/0082659 | A1 * | 4/2007 | Nevalainen ............... 455/418 |
| 2008/0082264 | A1 * | 4/2008 | Hill et al. .................. 701/213 |

FOREIGN PATENT DOCUMENTS

JP  2001-345944  12/2001

* cited by examiner

*Primary Examiner*—Hong Cho
(74) *Attorney, Agent, or Firm*—The Farrell Law Firm, LLP (57) ABSTRACT

A system and method for performing remote calling through a first and a second mediator system connected for communication is are provided. The system includes a first mobile communication terminal connected to the first mediator system, and a second mobile communication terminal connected to the second mediator system, wherein the first communication terminal controls the second communication terminal through the first and second mediator systems so as to exchange communication data with a third mobile communication terminal.

14 Claims, 5 Drawing Sheets

SYSTEM AND METHOD FOR PERFORMING REMOTE CALLING

PRIORITY

This application claims priority under 35 U.S.C. §119(a) to a Korean Patent Application entitled "System and Method for Remote Calling" filed in the Korean Intellectual Property Office on Aug. 30, 2006 and assigned Serial No. 2006-83180, the contents of which are incorporated herein by reference.

BACKGROUND OF THE INVENTION

1. Field of the Invention

The present invention relates to a system for performing remote calling, and in particular, to a system and method for establishing communication between two mobile communication terminals remotely separated through another mobile communication terminal.

2. Description of the Related Art

Today, most mobile communication terminals include a wireless Local Area Network (LAN) module such as an infrared or Bluetooth communication module, which allows them to exchange data such as phone book or image data with another mobile communication terminal, personal computer, etc. through the wireless LAN module. Moreover, these mobile communication terminals may serve as remote control devices for remotely controlling various household appliances by utilizing such a built-in infrared communication module.

However, conventional wireless LAN modules have been designed to enable the mobile communication terminal to perform data communication only with an apparatus separated by a short distance from it, or within a small area. As such, a conventional mobile communication terminal cannot perform data communication with another apparatus located in a remote place or within a distance that is too far to allow the wireless LAN module to facilitate a proper connection.

Although the wireless LAN function of the mobile communication terminal is generally used simply for exchanging data such as phone numbers or images with other mobile communication terminal located nearby, it would also be possible to transfer data anywhere in the world if the mobile terminal were to be connected to a network accessible system (hereinafter, mediator system) such as a personal computer connected to the World Wide Web (www). However, even though a conventional mobile communication terminal can transfer data to a personal computer located in a foreign country through the mediator system, mobile terminals are currently not designed to enable the user to communicate with another in a foreign country through the Www. Namely, the user must use the conventional expensive mobile communication network in order to communicate with another mobile user stationed in a foreign country.

SUMMARY OF THE INVENTION

Accordingly, one aspect of the present invention is to provide a mobile communication terminal having a wireless LAN module with a method and system for accessing and controlling an apparatus very remotely separated.

Another aspect of the present invention is to provide a method and system for enabling a mobile communication terminal having a wireless LAN module to communicate with another mobile terminal by remotely controlling further another mobile terminal.

According to one aspect of the present invention, there is provided a system for performing remote calling through a first and a second mediator system connected for communication. The system includes a first mobile communication terminal connected to the first mediator system, and a second mobile communication terminal connected to the second mediator system, wherein the first communication terminal controls the second communication terminal through the first and second mediator systems so as to exchange communication data with a third mobile communication terminal.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The invention provides a system and method of enabling a mobile communication terminal having a wireless LAN module to communicate with another mobile communication terminal remotely located by controlling further another remote mobile communication terminal. The system includes a first and a second mediator system connected together for communication, and a first and a second mobile communication terminal respectively connected to the first and second mediator systems, wherein the first mobile communication terminal controls the second mobile communication terminal through the first and second mediator systems so as to communicate with a third mobile communication terminal. Thus, the first mobile communication terminal advantageously reduces the communication costs associated with the third mobile communication terminal being remotely located by employing the second mobile communication terminal.

Figure 1:
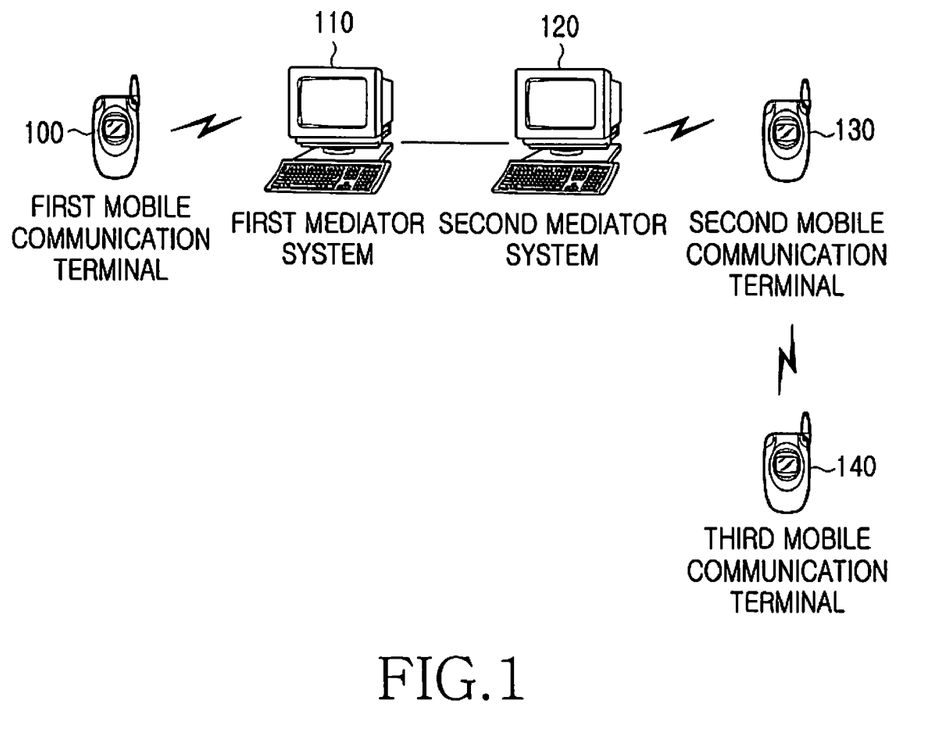
FIG. 1 is a schematic diagram illustrating a remote calling system according to an embodiment of the present invention.

In FIG. 1, the remote calling system is shown including a first mobile communication terminal 100, a first mediator system 110, a second mediator system 120, a second mobile communication terminal 130, and a third mobile communication terminal 140. The first and second mobile communication terminals 100 and 130 are respectively connected to the first and second mediator systems 110 and 120 by a conventional connection means. The first and second mediator systems 110 and 120 are connected together by a remote connection means to provide a communication channel between the first and the second mobile communication terminal 100 and 130. Thus, the first mobile communication terminal 100 may remotely control the second mobile communication terminal 130 through the first and second mediator systems 110 and 120 so as to perform a remote calling for the third mobile terminal 140. In this embodiment, the conventional connection means represents a wireless LAN.

Figure 2:
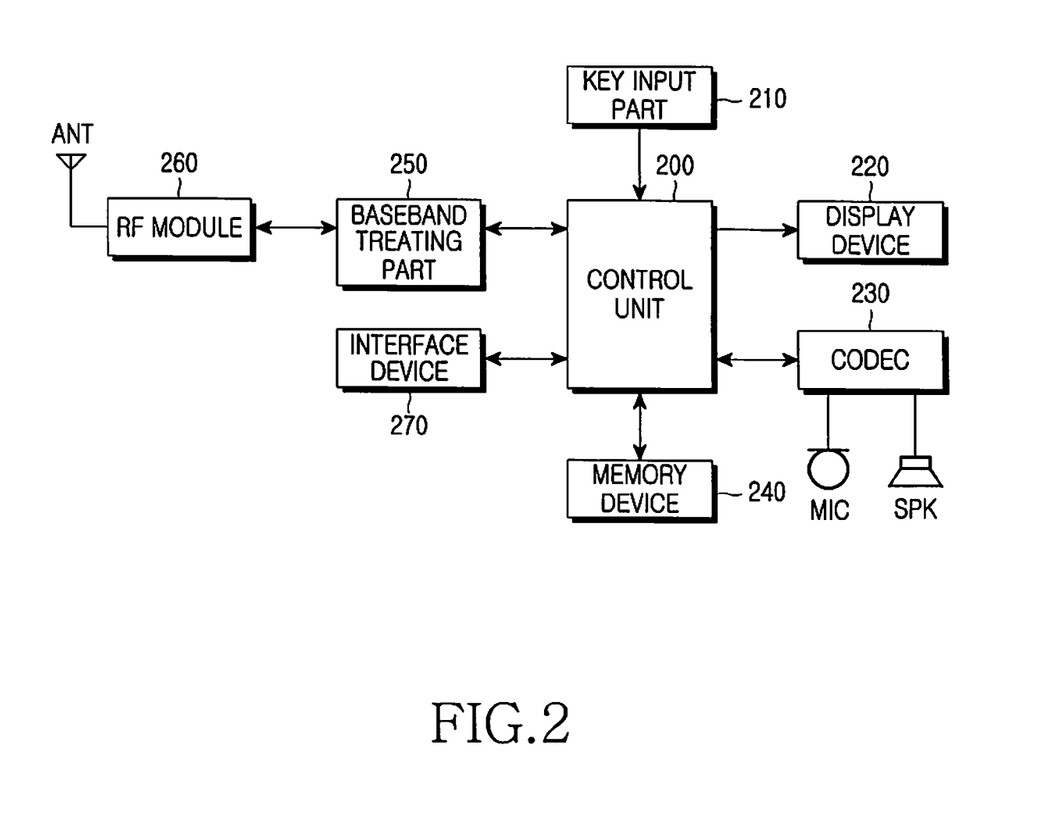
FIG. 2 is a schematic diagram illustrating the structure of a first and a second mobile communication terminal used for a remote calling system according to an embodiment of the present invention.

FIG. 2 is a schematic diagram illustrating the structure of the first and second mobile communication terminals 100 and 130 respectively, where each includes a control unit 200 for controlling the various functions of the first and second mobile communication terminals 100 and 130 including voice communication, data communication, and wireless Internet connection. A key input part 210 provides a number of various keys for enabling the user to enter key input data delivered to the control unit 200 and a display device 220 is provided for displaying the images received or stored or various visual operational information under the control of the control unit 200. The display device 220 of the first mobile communication terminal 100 displays the screen data of the second mobile communication terminal 130 delivered to the first mobile communication terminal.

A memory device 240 stores the micro-codes of the program for the processing and controlling of the control unit 200 together with various reference data, serves as the working memory of the control unit 200, and also provides a memory region for storing various revisable data. A codec 230 is connected through an amplifier to a microphone and a speaker, encoding the sound signal entered by the microphone into pulse code modulated sound data delivered to the control unit 200, which in turn sends the sound data through the first and second mediator system 110 and 120 to the second mobile communication terminal 130. The codec 230 also decodes the pulse code modulated sound data received from the second mobile communication terminal 130 into the corresponding sound signal outputted through the speaker.

In addition, an Radio Frequency (RF) module 260 is provided to exchange radio signals with a base station, modulating the signals received from the control unit 200 through a baseband treating part 250 into the corresponding RF signals sent to the base station and demodulating the RF signals received from the base station. The demodulated signals are delivered through the baseband treating part 250 to the control unit 200. The baseband treating part 250 treats the baseband signals received from the RF module 260 and the control unit 200. Also, an interface device 270 is provide to interface with the first mediator system 110 to exchange various data including sound data through the wireless LAN module under the control of the control unit 200.

Figure 3:
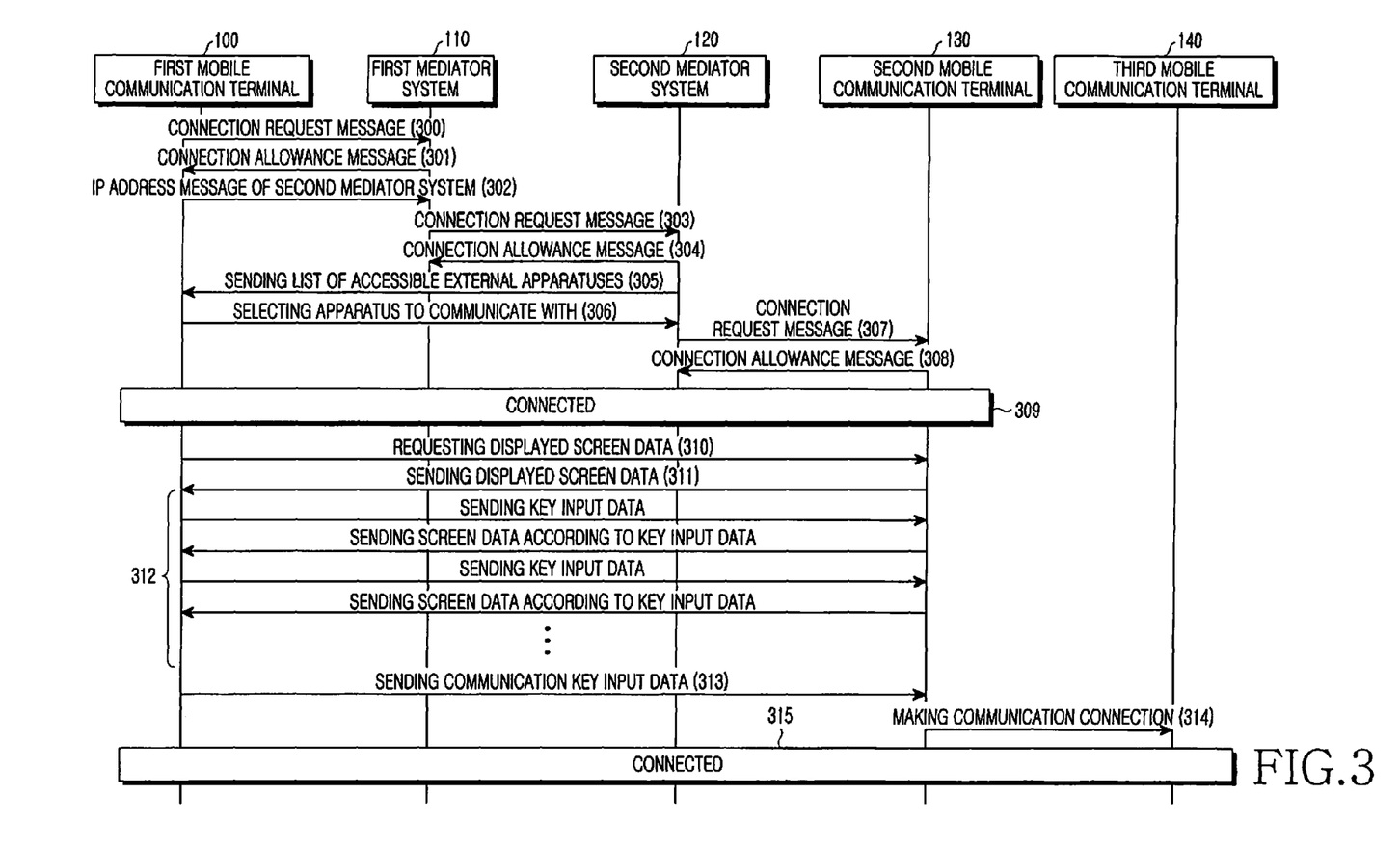
FIG. 3 is a flow diagram illustrating the process of enabling a first mobile communication terminal to control a second mobile communication terminal so as to communicate with a third mobile communication terminal according to an embodiment of the present invention.

FIG. 3 is a flow diagram illustrating the process for enabling the first mobile communication terminal 100 to communicate with the third mobile communication terminal 140 by controlling the second mobile communication terminal 130. In step 300, the first mobile communication terminal 100 sends a connection request message to the first mediator system 110 through a conventional connection device. Then the first mediator system 110 proceeds to step 301 to send a connection allowance message to the first mobile communication terminal 100. Subsequently, when there is connection made between the first mobile communication terminal 100 and the first mediator system 110 through steps 300 and 301, the first mobile communication terminal 100 sends in step 302 the identifying address of the second mediator system 120 to the first mediator system 110. The identifying address may be an IP (Internet Protocol) address.

Next, after receiving the identifying address, the first mediator system 110 proceeds to step 303 to send a connection request message to the second mediator system 120 identified by the address. Then the second mediator system 120 sends in step 304 a connection allowance message to the first mediator system 110. Having established the connection to the first mediator system 110, the second mediator system 120 proceeds to step 305 to search accessible external apparatuses through a conventional connection device and then send their list through the first mediator system 110 to the first mobile communication terminal 100. Then the first mobile communication terminal 100 sends in step 306 the information of the apparatus selected from the list through the first mediator system 110 to the second mediator system 120. The second mediator system 120 then proceeds to step 307 to send a connection request message to the apparatus selected by the first mobile communication terminal 100, i.e., the second mobile communication terminal 130. Subsequently, if the second mobile communication terminal 130 sends in step 308 a connection allowance message to the second mediator system 120 in response to the connection request message, there is established a communication connection between the second mediator system 120 and second mobile communication terminal 130.

The second mobile communication terminal 130 being connected to the second mediator system 120, the first mobile communication terminal 100 proceeds to step 309 to make a communication connection with the second mobile communication terminal 130 through the first and second mediator systems 110 and 120. Then the first mobile communication terminal 100 proceeds to step 310 to send a screen data request message for requesting the second mobile communication terminal 130 to send its displayed screen data. Thereafter, the second mobile communication terminal 130 proceeds to step 311 to send its displayed screen data to the first mobile communication terminal 100.

With a communication connection made between the first and the second mobile communication terminal 100 and 130, the user of the first mobile communication terminal 100 then enters the phone number of the third mobile communication terminal 300 to communicate with. Here, whenever each numeric key is entered, the first mobile communication terminal 100 sends the key input data through the first and second mediator systems 110 and 120 to the second mobile communication terminal 130. Thus, the user of the first mobile communication terminal 100 can input the phone number to the second mobile communication terminal 130 as if to his terminal.

Whenever receiving each numeric key input data, the second mobile communication terminal 130 updates its display screen in order to display the present numeric key input data, sending the updated screen data to the first mobile communication terminal 100. This procedure is kept on repeating until the user of the first mobile communication terminal 100 enters the communication key. This repeated procedure is shown in step 312. Meanwhile, the second mobile communication terminal 130 sends its updated screen data at each given interval to the first mobile communication terminal 100 even without receiving any key input data, so that the user may be periodically informed of the screen state of the second mobile communication terminal 130 by the display device 220 of the first mobile communication terminal 100.

Then, if the user of the first mobile communication terminal 100 enters the communication key after completing the input of the phone number of the third mobile communication terminal 140, the first mobile communication terminal 100 proceeds to step 313 to send the communication key data to the second mobile communication terminal 130. Then the second mobile communication terminal 130 proceeds to step 314 to make a communication connection to the third mobile communication terminal 140 identified by the phone number. Accordingly, the first mobile communication terminal 100 proceeds to step 315 to exchange voice communication with the third mobile communication terminal 140 by remotely controlling the second mobile communication terminal 130.

In this case, the second mobile communication terminal 130 decodes the voice data encoded by the first mobile communication terminal 100, and then again may encode it to the data type fit for the communication connection mode of the third mobile communication terminal 140. This enables voice communication between the first and third mobile communication terminals 100 and 140 that may be operated under different communication connection modes. For example, assuming that the first mobile communication terminal 100 is Code Division Multiple Access (CDMA) type, and the second and third mobile communication terminals 130 and 140 Universal Mobile Telecommunications System (UMTS) type, the second mobile communication terminal 130 will convert the voice data received from the first mobile communication terminal 100 into Adaptive Multi-Rate Speech Codec (AMR) data format.

Figure 4:
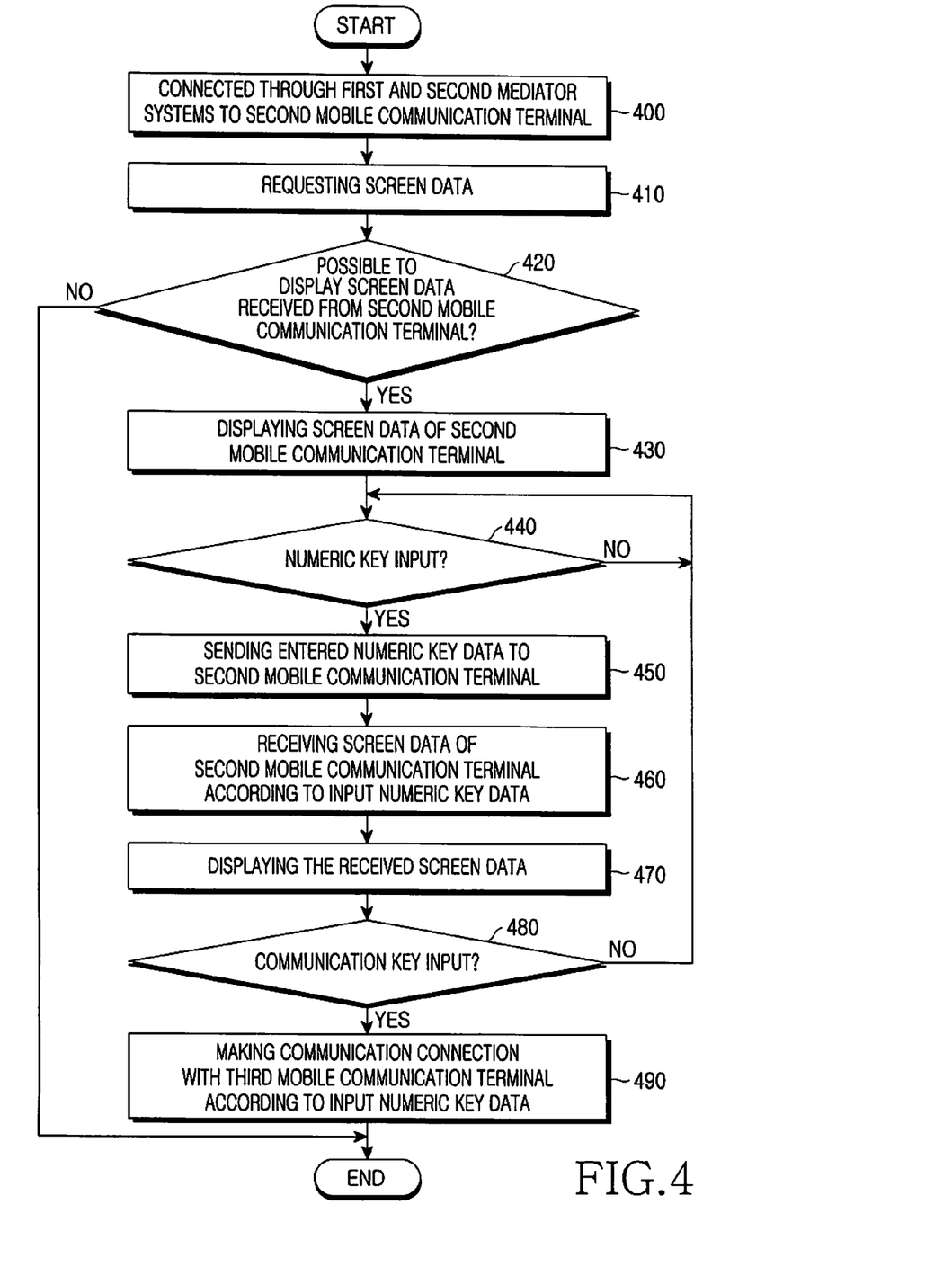
FIG. 4 is a flowchart illustrating the process of a first mobile communication terminal in a remote calling system according to an embodiment of the present invention.

In FIG. 4, a flowchart is shown illustrating the process of enabling the first mobile communication terminal 100 to perform voice communication with the third mobile communication terminal 140 by remotely controlling the second mobile communication terminal 130.

In operation, when the first mobile communication terminal 100 is connected in step 400 through the first and second mediator systems 110 and 120 remotely connected together to the second mobile communication terminal 130, it proceeds to step 410 to request the displayed screen data from the second mobile communication terminal 130. Receiving the screen data of the second mobile communication terminal 130, the first mobile communication terminal 100 determines in step 420 if the information of the screen data may be displayed. If not, the first mobile communication terminal 100 terminates the connection with the second mobile communication terminal 130. However, if it is possible to display the screen data in step 420, the first mobile communication terminal 100 proceeds to step 430 to display the screen data of the second mobile communication terminal 130 through the display device 220. Then the first mobile communication terminal 100 proceeds to step 440 to determine if the user enters a numeric key. If so, the first mobile communication terminal 100 sends the numeric key input signal through the first and second mediator systems 110 and 120 to the second mobile communication terminal 130. The numeric keys entered may represent the phone number of the third mobile communication terminal 140. Here, we assume that the phone number of the third mobile communication terminal 140 be 123-456-7890.

In particular, if the numeric key numbered 1 is entered in step 440, the first mobile communication terminal 100 proceeds to step 450 to send the numeric key data representing 1 to the second mobile communication terminal 130. Then it proceeds to step 460 to receive the displayed screen data of the second mobile communication terminal 130 updated so as to include the numeric key data representing the number 1. Then the first mobile communication terminal 100 proceeds to step 470 to display the updated screen data in the display device 220, so that the number 1 displayed on the screen of the second mobile communication terminal 130 is also displayed on the screen of the first mobile communication terminal 100. Thus, the user can confirm the numeric key inputted to the second mobile communication terminal 130, enjoying the effect similar to having directly entering the phone number into the second mobile communication terminal 130. The same procedure is repeated by the first mobile communication terminal 100 until all of the remaining numeric keys representing the numbers of 23-456-7890 have been entered as seen in step 480. The first mobile communication terminal 100 then proceeds to step 490 to make a voice communication connection with the third mobile communication terminal 140. Accordingly, the first mobile communication terminal 100 can exchange voice communication with the third mobile communication terminal 140 by remotely controlling the second mobile communication terminal 130 through the first and second mediator systems 110 and 120.

Figure 5:
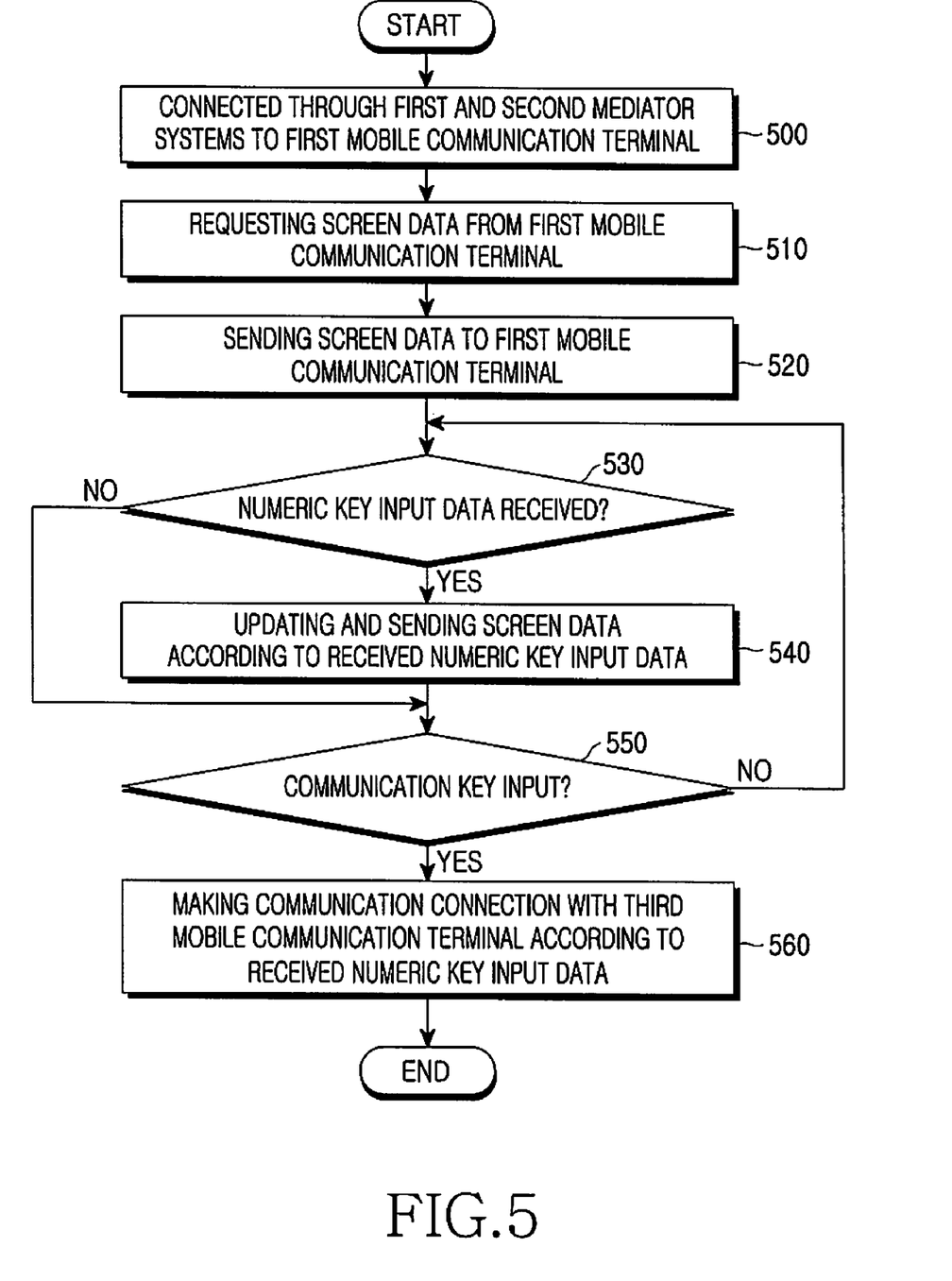
FIG. 5 is a flowchart illustrating the process of a second mobile communication terminal in a remote calling system according to an embodiment of the present invention.

In FIG. 5, a flowchart illustrates the process of the second mobile communication terminal 130 in a remote calling system according to the present invention. Here, when the second mobile communication terminal 130 is connected through the first and second mediator systems 110 and 120 to the first mobile communication terminal 100 in step 500, it proceeds to step 510 to receive a screen data request from the first mobile communication terminal 100. Then the second mobile communication terminal 130 proceeds to step 520 to send its presently displayed screen data to the first mobile communication terminal 100 in response to the screen data request. Then the second mobile communication terminal 130 proceeds to step 530 to determine if the key input data received from the first mobile communication terminal 100 represents a number. If so, the second mobile communication terminal 130 then proceeds to step 540 to update the displayed screen data so as to include the received numeric key input data, thereby sending the updated screen data to the first mobile communication terminal 100. Or, otherwise, the second mobile communication terminal 130 directly proceeds to step 550 to determine if the received key input data represents the communication key.

After step 540, the second mobile communication terminal 130 proceeds to step 550 to determine if the received key input data represents the communication key. If so, the second mobile communication terminal 130 proceeds to step 560 to make a voice communication connection with the third mobile communication terminal 140 identified by the received numeric key input data. If the key input data represents a numeric key instead of the communication key in step 550, then the second mobile communication terminal 130 proceeds to step 530 to repeat the same procedure until receiving the communication key. Thus, the system advantageously enables the first mobile communication terminal 100 to exchange voice communication with the third mobile communication terminal 140 by remotely controlling the second mobile communication terminal 130.

As described above, the present invention enables a mobile communication terminal with a wireless LAN module to perform remote calling for another mobile communication terminal by remotely controlling further another mobile communication terminal, and, also, to control a remote apparatus in the same way. Hence, the invention can considerably reduce the costs associated with exchanging voice communication between two persons remotely separated. Furthermore, the system may be used for costs effectively sending a character message, such as, for example, a Short Messaging Service (SMS) and Multimedia Messaging Service (MMS).

While the invention has been shown and described with reference to a certain preferred embodiment thereof, it will be understood by those skilled in the art that various changes in form and details may be made therein without departing from the spirit and scope of the invention.

What is claimed is:

1. A system provided with a first and a second mediator system for performing remote calling, the system comprising:
   a first mobile communication terminal connected through the first and second mediator systems to a second mobile communication terminal among external instruments connectable to the second mediator system, the first mobile communication terminal controlling said second mobile communication terminal so as to communicate with a third mobile communication terminal of a person with whom the user intends to communicate; and
   the second mobile communication terminal connected through the first and second mediator systems to the first mobile communication terminal, the second mobile communication terminal being connected to the third mobile communication terminal under the control of the first mobile communication terminal so as to mediate communication data between the first and third mobile communication terminals.

2. The system of claim 1, wherein the second mediator system sends a list of the external apparatuses including the second mobile communication terminal connectable thereto through the first mediator system to the first mobile communication terminal, so that the second mediator system may make a connection with the second mobile communication terminal upon request of the first mobile communication terminal.

3. The system of claim 1, wherein the second mobile communication terminal sends its presently displayed screen data to the first mobile communication terminal upon request.

4. The system of claim 3, wherein the first mobile communication terminal displays the received screen data of the second mobile communication terminal.

5. The system of claim 1, wherein the second mobile communication terminal connects the first mobile communication terminal with the third mobile communication terminal according to the key input signal entered by the user through the first mobile communication terminal.

6. The system of claim 1, wherein the communication data includes voice communication data and character message data.

7. A method for enabling a first mobile communication terminal to remotely control a second mobile communication terminal so as to establish a communication connection with a third mobile communication terminal in a system comprising a first and a second mediator system respectively connected with the first and second mobile communication terminals for providing a communication channel between the first and the second mobile communication terminals, the method comprising:
   connecting the first mobile communication terminal to the first mediator system by means of a predetermined connection procedure;
   entering the address information of said second mediator system through the first mobile communication terminal;
   causing the second mediator system to send a list of the external apparatuses including the second mobile communication terminal connectable by the second mediator system to the first mobile communication terminal;
   selecting the second mobile communication terminal from the list of the external apparatuses and sending a identification information of the selected second mobile communication terminal to the second mediator system;
   controlling the second mobile communication terminal to make a communication connection with the third mobile communication terminal; and
   performing communication with the third mobile communication terminal through the second mobile communication terminal.

8. The method of claim 7, wherein the connection procedure employs a wireless LAN.

9. The method of claim 7, wherein controlling the second mobile communication terminal further includes:
   requesting the second mobile communication terminal to send its displayed screen data through the first and second mediator systems to the first mobile communication terminal; and
   causing the first mobile communication terminal to display the screen data received from the second mobile communication terminal.

10. The method of claim 7, wherein making the first communication terminal perform communication with the third mobile communication terminal further includes:
   causing the first mobile communication terminal to send numeric key input data through the first and second mediator systems to the second mobile communication terminal;
   causing the second mobile communication terminal to send its displayed screen data including the numeric key input data to the first mobile communication terminal;
   causing the first mobile communication terminal to send communication key input data through the first and second mediator systems to the second mobile communication terminal; and
   causing the first mobile communication terminal to control the second mobile communication terminal so as to establish a communication connection with the third mobile communication terminal.

11. A method for enabling a second mobile communication terminal to mediate communication data between a first and third mobile communication terminals under the remote control of a first mobile communication terminal in a system comprising a first and a second mediator system respectively connected with the first and second mobile communication terminals for providing a communication channel between the first and second mobile communication terminals, the method comprising:
   causing the second mobile communication terminal to establish a communication connection with the second mediator system upon the request of the second mediator system;
   causing the second mobile communication terminal to establish a communication connection with the third mobile communication terminal under the control of said first mobile communication terminal; and
   causing the second mobile communication terminal to mediate communication data between the first and third mobile communication terminals.

12. The method of claim 11, wherein causing the second mobile communication terminal to establish a communication connection with the third mobile communication terminal further includes:
   causing the second mobile communication terminal to send its displayed screen data to the first mobile communication terminal upon the request of the first mobile communication terminal;
   causing the second mobile communication terminal to generate the displayed information of the numeric key input data received from the first mobile communication terminal, the displayed information being sent back to the first mobile communication terminal; and causing the second mobile communication terminal to establish a communication connection with the third mobile communication terminal identified by the numeric key input data upon receiving the communication key data entered by the first mobile communication terminal.

13. The method of claim 12, wherein causing the second mobile communication terminal to generate and send the displayed information further includes sending the displayed screen information of the second mobile communication terminal to the first mobile communication terminal at every predetermined time even if there is no numeric key input data received from the first mobile communication terminal.

14. The method of claim 12, wherein said numeric key input data represent the phone number of the third mobile communication terminal.

* * * * *